Oct. 31, 1933.  M. C. DODGE  1,932,576
ANTISKID DEVICE
Filed April 18, 1932

Inventor
Milo C. Dodge,
By Church & Church
his Attorneys

Patented Oct. 31, 1933

1,932,576

UNITED STATES PATENT OFFICE

1,932,576

ANTISKID DEVICE

Milo C. Dodge, Auburn, N. Y., assignor to Columbian Rope Company, Auburn, N. Y., a corporation of New York Application April 18, 1932. Serial No. 606,005

5 Claims. (Cl. 152—14)

This invention relates to improvements in anti-skid devices especially adapted for use on vehicle wheels.

One object is to produce an efficient but comparatively inexpensive anti-skid device of a light weight construction whereby it may be readily applied to and removed from the wheel.

Another object is to provide a skid-device wherein the side members that extend around the wheel and the cross members that extend laterally of the wheel tread are produced in an integral structure with all of said members formed with exterior or wearing surfaces of rubber.

The entire device may be made solely of rubber but it is preferably provided with a fibrous core to impart tensile strength thereto and a further object is to form said core of two continuous lengths of fiber with the fibers of the two lengths or groups overlapping in the cross members so as to give greater body to said members.

A further object is to provide an anti-skid device which is not only of comparatively low cost but which will not be likely to scratch or mar the appearance of the wheel. More specifically, this object contemplates the provision of inextensible, resilient side members with which either rubber covered cross members or metallic cross members may be used, although the former are preferred on account of cost of production and elimination of vibration and noise.

Another object is the provision of side members to which the cross members may be readily attached. For instance, the side members may be made of strand formation, either a plurality of strands individually covered with rubber, or a plurality of strands of fibers collectively covered, and the ends of the cross members inserted between the strands and firmly secured by suitable fastening means.

With these and other objects in view, the invention consists in certain details of construction and combinations and arrangements of parts, all as will hereinafter be more fully described and the novel features thereof particularly pointed out in the appended claims.

Figure 1:
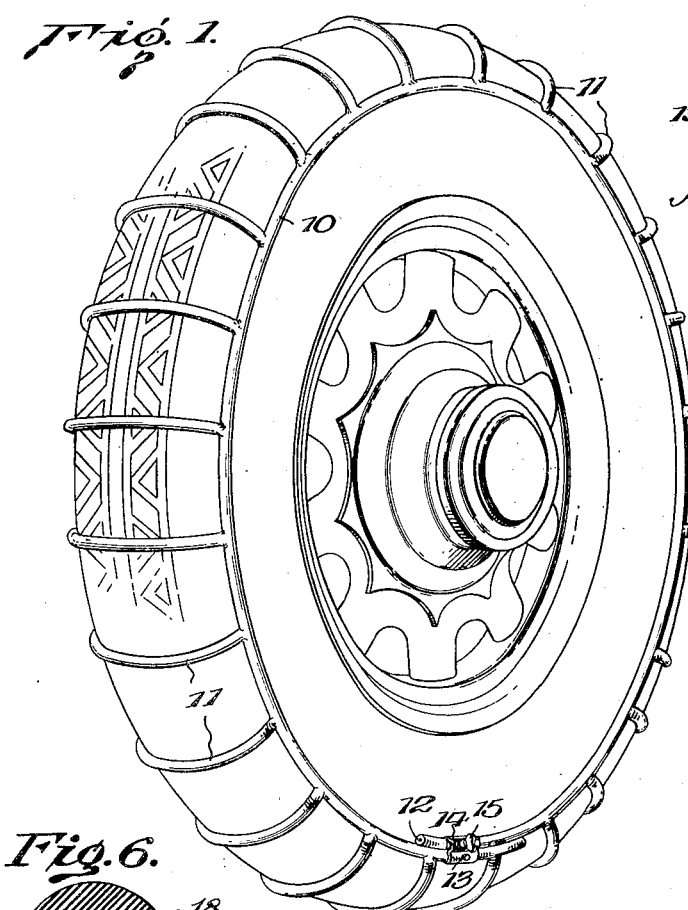
Figure 1 is a perspective view of a wheel with the present device applied thereto.
Figure 2:
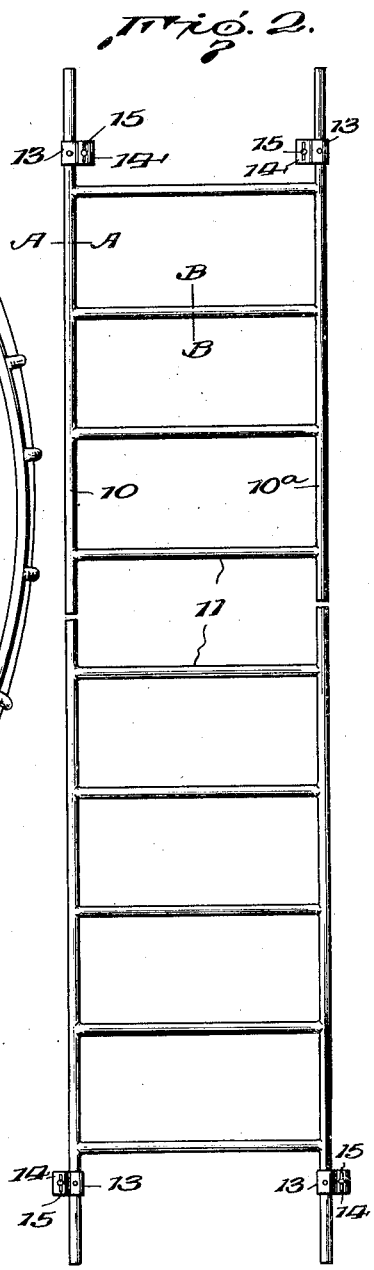
Fig. 2 is a plan view of the device.
Figures 3, 4:
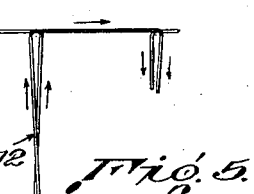
Fig. 3 is a sectional view on the line A—A of Fig. 2.
Fig. 4 is a like view on the line B—B of Fig. 2.
Figure 5:
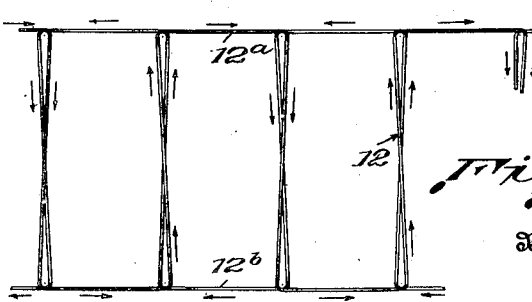
Fig. 5 is a diagrammatic illustration of the arrangement of the bodies of fibers composing the core of the side and cross members.

As illustrated in Figs. 1 to 3, the side members 10, 10ª which are adapted to extend circumferentially of the wheel and the several cross members 11 that extend transversely of the wheel tread, are all made integrally and formed of a yielding, pliant construction. They may be composed entirely of rubber but preferably they are formed with a core 12, which will impart tensile strength thereto. The rubber, properly treated and vulcanized, serves very efficiently from a wearing standpoint and, in addition, reduces or eliminates the noise and vibration incident to the use of chains in anti-skid devices. Also, the weight of the present device is considerably less than the devices composed of metallic link chains, thereby facilitating handling and application or removal of the devices. The cost of the present device is also considerably less than the metallic link chains.

Where the core 12 is used, it is preferably composed of a plurality, usually two, continuous lengths or slivers of fibers 12ª, 12ᵇ, arranged with respect to each other as shown in Fig. 5. That is, one group 12ª extends through the device in one direction and the other group 12ᵇ in the opposite direction with the two groups overlapping each other only in the cross pieces 11. In this way, the cross pieces which are the elements that must withstand the greatest wear, are formed of increased body or cross-section. In producing the present device, the groups of fibers may first be individually impregnated with a latex solution and then arranged as shown in Fig. 5 and subsequently incorporated in the rubber covering or sheathing. It is also preferred that the groups or slivers of fibers have very little, if any, twist therein.

For attaching the device on a wheel, the side members may be provided at one end with eyelets 13 extending inward from said members and at their opposite end with outwardly projecting eyelets 14 so that each end of each side member may be inserted in the eyelet at the opposite end thereof. Each eyelet is provided with a suitable fastening element, for instance, a clamping screw 15, for securing the ends in the eyelets.

Figure 6:
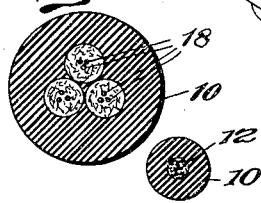
Figure 6 is a transverse section of a modified side member.

Various forms of fiber cores may be utilized in both the cross members and side members, but where the members are to be substantially inextensible, as in the case of the side members, and a reinforce is desired, wires or other metallic elements may be incorporated in said fibrous cores as shown at 18 in Fig. 6.

As will be apparent, the devices of the present invention possess the advantageous feature of preserving the appearance of the wheels to which they may be applied, by reason of the fact that there is no danger of the rubber or rubber covered side members 10, 10a scratching or otherwise marring the finish of the wheel.

What I claim is:

1. An anti-skid device having side members adapted to extend circumferentially of a vehicle wheel tread, and a continuous group of fibers extending through both the side members and cross members and constituting a core for said members.

2. An anti-skid device having side members adapted to extend circumferentially of a vehicle wheel and cross members adapted to extend laterally of the wheel tread, said side members and said cross members jointly having a core composed of two continuous lengths of fibrous material.

3. An anti-skid device having side members and integrally formed cross members adapted to extend circumferentially and laterally of a wheel tread, respectively, and a continuous group of fibers extending uninterruptedly from one end of said device to the other and through both the side and cross members and constituting a core for said members.

4. An anti-skid device having side members and integrally formed cross members adapted to extend circumferentially and laterally of a wheel tread, respectively, a continuous group of fibers extending the length of the device and through both the side and cross members and constituting a core for said members, and a continuous rubber sheath on said members.

5. An anti-skid device having side members and cross members adapted to extend around a wheel and across the wheel tread, respectively, and a continuous fiber core extending through said side members and cross members, said core comprising two continuous lengths of fibers with the fibers of the two lengths overlapping in said cross pieces.

MILO C. DODGE.